United States Patent
Guo et al.

(10) Patent No.: US 12,294,804 B2
(45) Date of Patent: May 6, 2025

(54) ADAPTIVE CORRELATED MULTIPLE SAMPLING

(71) Applicant: OMNIVISION TECHNOLOGIES, INC., Santa Clara, CA (US)

(72) Inventors: Jiayu Guo, Milpitas, CA (US); Hiroaki Ebihara, San Jose, CA (US); Liang Zuo, Milpitas, CA (US); Lihang Fan, Sunnyvale, CA (US); Satoshi Sakurai, Cupertino, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 216 days.

(21) Appl. No.: 18/322,431

(22) Filed: May 23, 2023

(65) Prior Publication Data
US 2024/0397226 A1    Nov. 28, 2024

(51) Int. Cl.
*H04N 25/78*    (2023.01)
*H04N 25/616*    (2023.01)

(52) U.S. Cl.
CPC ........... *H04N 25/78* (2023.01); *H04N 25/616* (2023.01)

(58) Field of Classification Search
CPC .... H04N 25/616; H04N 25/772; H04N 25/75; H04N 25/78
See application file for complete search history.

(56) References Cited

U.S. PATENT DOCUMENTS

| | | | |
|---|---|---|---|
| 11,431,936 B2 | 8/2022 | Fan et al. | |
| 12,200,389 B2* | 1/2025 | Ebihara | H04N 25/78 |
| 2015/0138408 A1* | 5/2015 | Lee | H04N 25/75 |
| | | | 348/294 |
| 2020/0153440 A1* | 5/2020 | Sakurai | H03K 23/005 |
| 2021/0329185 A1* | 10/2021 | Fan | H04N 25/75 |
| 2022/0210359 A1* | 6/2022 | Shikina | G05D 1/0246 |
| 2022/0269482 A1* | 8/2022 | Fan | G06F 7/575 |

OTHER PUBLICATIONS

U.S. Appl. No. 18/047,588, filed Oct. 18, 2022, 59 pages.
U.S. Appl. No. 17/934,196, filed Sep. 21, 2022, 60 pages.

* cited by examiner

*Primary Examiner* — Daniel M Pasiewicz
(74) *Attorney, Agent, or Firm* — Perkins Coie LLP; Daniel L. Jackstadt

(57) ABSTRACT

An arithmetic logic unit (ALU) includes a front end latch stage coupled to a Gray code (GC) generator to latch GC outputs, a signal latch stage coupled to latch outputs of the front end latch stage, a GC to binary stage coupled to generate a binary representation of the GC outputs, an adder stage including first inputs coupled to receive outputs of the GC to binary stage, a pre-latch stage coupled to latch outputs of the adder stage, and a feedback latch stage coupled to latch outputs of the pre-latch stage in response to a feedback latch enable signal. The feedback latch enable signal is one of a correlated multiple sampling (CMS) feedback enable signal and a non-CMS feedback enable signal. The ALU is configured to perform CMS calculations in response to the CMS feedback enable signal and perform non-CMS calculations in response to the non-CMS feedback enable signal.

21 Claims, 11 Drawing Sheets

ADAPTIVE CORRELATED MULTIPLE SAMPLING

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
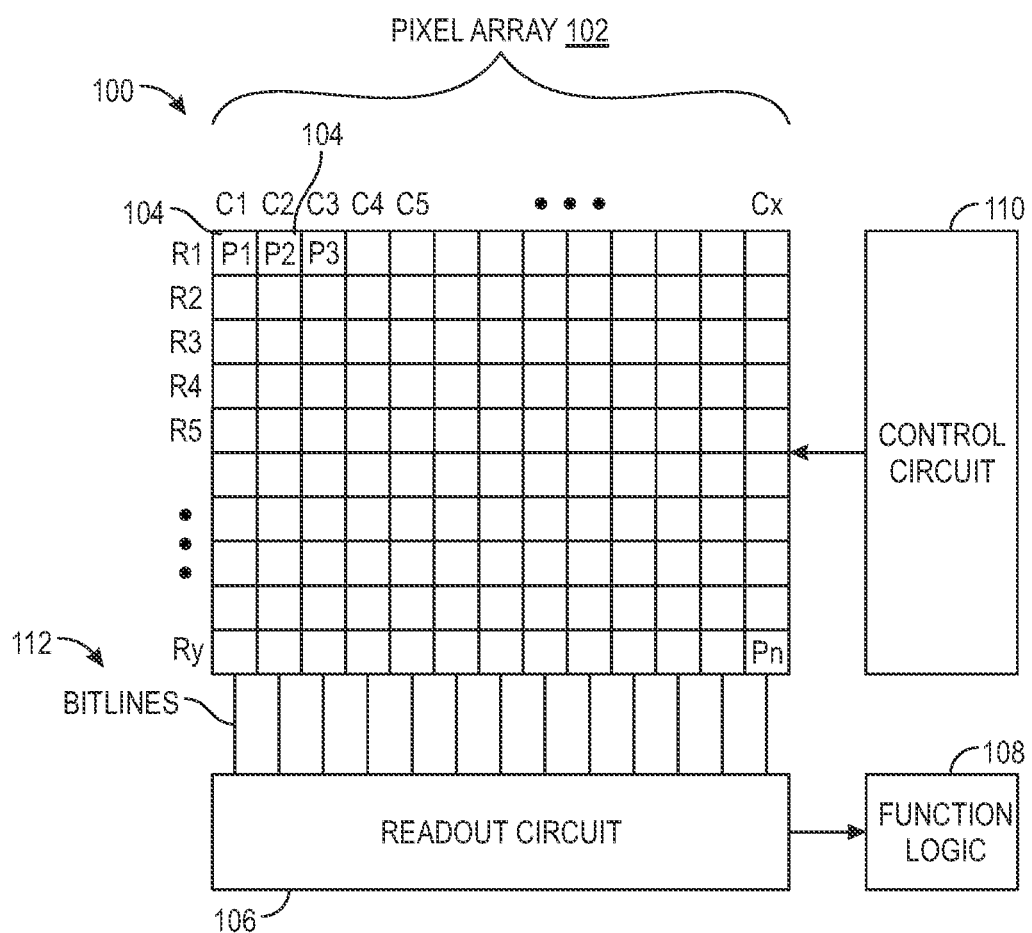
FIG. 1 illustrates one example of an imaging system including a pixel array in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with arithmetic logic units performing adaptive correlated multiple sampling and providing reduced readout periods are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with arithmetic logic units (ALUs) for performing adaptive correlated multiple sampling (CMS) and providing reduced readout periods are disclosed. CMS is a technique used to reduce the noise in analog-to-digital conversion (ADC) circuits by averaging out correlated noise sources. CMS involves sampling the same analog signal multiple times at different times and correlating the samples to reduce the noise, particularly those of high frequency. One of the benefits of CMS is reduced readout noise. In dark conditions when the signal is small, random noise from components of the readout circuit dominate, so using CMS can be advantageous. However, in bright conditions when the signal is large, photon shot noise dominates, so using CMS may not improve the signal-to-noise ratio (SNR). CMS also may not be effective in reducing low frequency noise, such as 1/f noise and random telegraph signals (RTS). Moreover, using CMS is associated with costs such as increased readout time and reduced frame rates.

In various examples, an adaptive CMS logic circuit determines whether a signal is small or large based on a comparator output. In various examples, an ALU performs CMS calculations if the signal is determined to be small and performs non-CMS calculations if the signal is determined to be large. Adapting the calculations performed based on the signal size preserves the benefits of using CMS while reducing readout periods.

In various examples of the present disclosure, an ALU includes a front end latch stage coupled to a Gray code (GC) generator to latch GC outputs of the GC generator in response to a comparator output, a signal latch stage coupled to latch outputs of the front end latch stage in response to a signal latch enable signal, a GC to binary stage coupled to generate a binary representation of the GC outputs latched in the signal latch stage, an adder stage including first inputs and second inputs, wherein the first inputs of the adder stage are coupled to receive outputs of the GC to binary stage, wherein outputs of the adder stage are generated in response to the first inputs and the second inputs of the adder stage, a pre-latch stage coupled to latch outputs of the adder stage in response to a pre-latch enable signal, and a feedback latch stage coupled to latch outputs of the pre-latch stage in response to a feedback latch enable signal, wherein the second inputs of the adder stage are coupled to receive outputs of the feedback latch stage. The feedback latch enable signal is one of a correlated multiple sampling (CMS) feedback enable signal and a non-CMS feedback enable signal. The ALU is configured to perform CMS calculations in response to the CMS feedback enable signal, and the ALU is configured to perform non-CMS calculations in response to the non-CMS feedback enable signal.

To illustrate, FIG. 1 shows one example of an imaging system 100 having a readout circuit 106 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, the readout circuit 106 may be configured to read out the image signals through the column bitlines 112. As will be discussed, in the various examples, readout circuit 106 may include an analog-to-digital converter (ADC) in accordance with the teachings of the present disclosure. In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
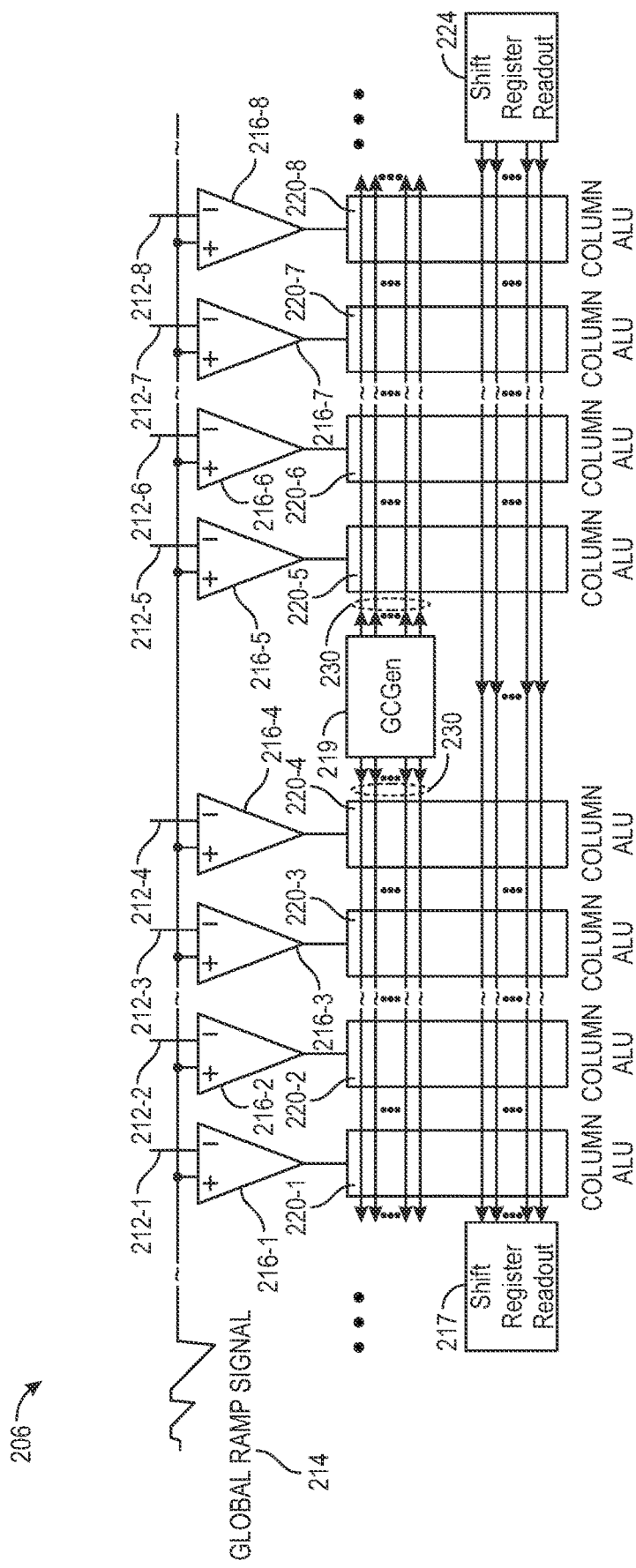
FIG. 2 illustrates one example of a portion of a readout circuit including column analog to digital conversion with a Gray code generator and parallel column arithmetic logic units in accordance with the teachings of the present disclosure.

FIG. 2 illustrates one example of a portion of a readout circuit 206 including column analog to digital conversion with a Gray code generator 219 and parallel column arithmetic logic units 220 in accordance with the teachings of the present disclosure. It is appreciated the readout circuit 206 of FIG. 2 may be one example of the readout circuit 106 of the image sensor 100 as shown in FIG. 1, and that similarly named and numbered elements described above are coupled and function similarly below.

As shown in the example depicted in FIG. 2, the portion of readout circuit 206 includes a plurality of comparators 216. Each one of the plurality of comparators 216 is coupled to receive a ramp signal 214, which in one example is a global ramp signal. Each one of the plurality of comparators 216 is further coupled to a respective one of a plurality of column bit lines 212 from an image sensor to receive a respective analog image data signal from a column of the image sensor. As shown in the example, the outputs of the plurality of comparators 216 are coupled in parallel to respective column ALUs 220. Each one of the plurality of ALUs 220 is also coupled to receive Gray code (GC) outputs 230 that are generated by a shared Gray code (GC) generator 219 as shown. In one example, the GC outputs 230 that are generated by the GC generator 219 are phase-aligned 13-bit Gray code signals.

In operation, each one of the plurality of comparators 216 is coupled to generate a respective comparator output in response to a comparison of the respective analog image data signal received from the respective bit line 212 and the ramp signal 214. In one example, when the voltage of the ramp signal 214 ramps down to a value equal to or less than the voltage of the analog image data signal carried by the respective column bit line 212, a falling edge occurs at the output of the respective comparator 216. In the example, each respective column ALU 220 is coupled to sample and hold, or latch, the 13-bit Gray code signal 230 received from the GC generator 219 when the falling edge occurs at the output of the respective comparator 216 that is coupled to the respective column ALU 220. As will be discussed, in the various examples, each column ALU 220 is then configured to perform Gray code to binary code conversion on the latched GC code signal 230.

In various examples, the column ALUs 220 may also be coupled to perform adaptive correlated multiple sampling (CMS) operations in parallel by determining a difference between an accumulated sum of sampled and held reset (SHR) values (which may also be referred to as reset signals in this disclosure) and an accumulated sum of one or more sampled and held signal (SHS) samplings (which may also be referred to as image signals in this disclosure) from the respective column bit lines 212 to generate normalized digital image signal data from the image sensor in accordance with the teachings of the present invention. In one example, the digital image signal data generated from the column ALUs 220 may then be output to respective global read bit lines of the readout circuit 206.

In one example, the portion of readout circuit 206 shown in FIG. 2 may be one of a plurality of portions of readout circuit 206 that are repeated or "stitched together" across the columns of an image sensor array. In the example shown in FIG. 2, the image signal outputs from the column ALUs 220 may therefore be relayed from "right" to "left" through the column ALUs 220 of each portion of readout circuit 206, and with shift register readouts 217 coupled to the first and last columns and interspersed between every N columns of the image sensor array, to read out the image data from the image sensor array. For instance, in an example of a 48 megapixel sensor array, there are 8,000 columns. In the example, a single GC generator 219 may be shared among each N=500 columns of the sensor array, such that a total of 16× portions of readout circuit 206 shown in FIG. 2 are included between shift register readouts 217 coupled to the first and last columns and interspersed between every 500 columns to readout the image signal outputs from the sensor array. In other words, shift readout registers 217 are coupled to respective ALUs 220 that are coupled to the first and last columns of the image sensor. In addition, shift registers 217 are coupled to and are interspersed between the plurality of ALUs 220 of each one of the plurality of readout circuits 206 to readout the respective digital image data signals from the plurality of ALUs 220.

Figure 3:
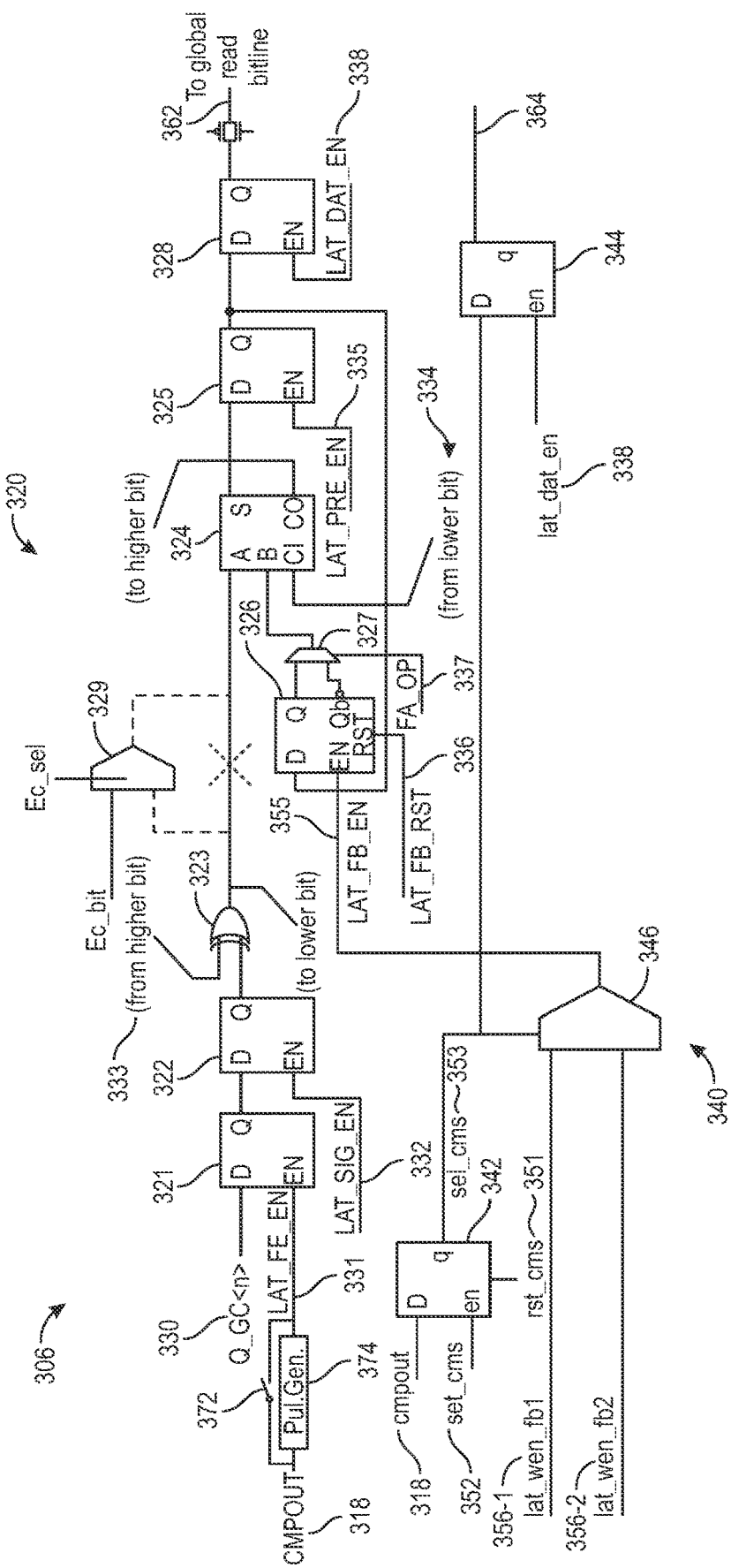
FIG. 3 illustrates an example readout circuit in accordance with the teachings of the present disclosure.

FIG. 3 illustrates an example readout circuit 306 in accordance with the teachings of the present disclosure. The readout circuit 306 includes an arithmetic logic unit (ALU) 320 coupled to receive a comparator output CMPOUT 318 from a comparator configured to make a comparison of the respective analog image data signal received from a respective bit line and ramp signal. Readout circuit 306 also includes an adaptive CMS logic circuit 340 also coupled to receive the comparator output 318. It is appreciated the readout circuit 306 of FIG. 3 may be one example of the readout circuit 106 as shown in FIG. 1, the ALU 320 nay be one example of the ALUs 220 as shown in FIG. 2, and that similarly named and numbered elements described above are coupled and function similarly below.

The ALU 320 includes a front end latch stage 321 coupled to a GC generator (e.g., the GC generator 219 shown in FIG. 2) to latch GC outputs Q_GC<n>330 of the GC generator in response to a comparator output 318. The comparator output 318 may be directly coupled to the front end latch stage 321 via a bypass switch 372 or pass through a pulse trigger 374, either of which provides a front end latch enable signal LAT_FE_EN 331. A signal latch stage 322 is coupled to latch outputs of the front end latch stage 321 in response to a signal latch enable signal LAT_SIG_EN 332. A GC to binary stage 323, represented as an XOR gate, is coupled to generate a binary representation of the GC outputs 330 latched in the signal latch stage 322. In various examples, the ALU 320 does not include the signal latch stage 322, and the GC to binary stage 323 is coupled to generate a binary representation of the GC outputs 330 latched in the front end latch stage 321.

An adder stage 324 includes first inputs "A" and second inputs "B." In various examples, the first inputs of the adder stage 324 are coupled to directly receive outputs of the GC to binary stage 323. In various examples, the first inputs of the adder stage 324 are coupled to receive the outputs of the GC to binary stage 323 through an error correction multiplexer stage 329, as shown via dotted lines. The error correction multiplexer stage 329 is coupled to receive the outputs of the GC to binary stage 323 and an error correction bitline signal Ec_bit. The error correction multiplexer stage 329 is coupled to generate error correction multiplexer outputs in response to an error correction select signal Ec_sel, and the first inputs of the adder stage 324 are coupled to receive the error correction multiplexer outputs. Outputs of the adder stage 324 are generated in response to the first inputs and the second inputs of the adder stage. A pre-latch stage 325 is coupled to latch outputs of the adder stage 324 in response to a pre-latch enable signal LAT_PRE_EN 335.

A feedback latch stage 326 is coupled to latch outputs of the pre-latch stage 325 in response to a feedback latch enable signal LAT_FB_EN 355. The second inputs of the adder stage 324 are coupled to receive outputs of the feedback latch stage 326. As shown in the example, the outputs of the feedback latch stage 326 include a first output "Q" and a second output "Qb." The first output "Q" of the feedback latch stage 326 is the latched output of the pre-latch stage 325. The second output "Qb" of the feedback latch stage 326 is an inverted form of the latched output of the pre-latch stage 325.

In the illustrated example, the ALU 320 also includes a first multiplexer stage 327 coupled between the feedback latch stage 326 and the adder stage 324. In operation, the first multiplexer stage 327 is configured to select either the first output "Q" or the second output "Qb" of the feedback latch stage 326 to be coupled to the second input of the adder stage 324 in response to an adder operation signal FA_OP 337. Therefore, the adder operation signal FA_OP 337 can be controlled to select between addition and subtraction operations of the ALU 320. It is appreciated that the feedback latch stage 326 is configured to feed back the output of the adder stage 324 back into the second input of the adder stage 324 through the pre-latch stage 325. In so doing, the sums generated by the adder stage 324 can be accumulated in the pre-latch stage 325 and then transferred to the feedback latch stage 326 over multiple summing operations of the adder stage 324 between resets of the feedback latch stage 326, via a feedback latch reset signal LAT_FB_RST 336, in accordance with the teachings of the present disclosure.

As discussed above, it is appreciated that the adder stage 324 is configured to perform addition by adding a feedback value latched in the feedback latch stage 326 and the binary representation of the GC outputs latched in the signal latch stage 322 through GC to binary stage 323 when the first multiplexer stage 327 is configured to couple the first outputs "Q" of the feedback latch stage 326 to the second inputs of the adder stage 324. Similarly, the adder stage 324 is configured to perform subtraction by adding the two's complement representation of a feedback value latched in the feedback latch stage 326 and the binary representation of the GC outputs latched in the signal latch stage 322 through the GC to binary stage 323 when the first multiplexer stage 327 is configured to couple the second outputs "Qb" of the feedback latch stage 326 to the second inputs of the adder stage 324.

Continuing with the illustrated example, ALU 320 further includes a data latch stage 328 coupled between the pre-latch stage 325 and an ALU output 362. In operation, the data latch stage 328 is coupled to latch the output of the pre-latch stage 325 in response to a data latch enable signal LAT_DAT_EN 338. In various examples, the ALU output 362 is coupled to a global read bitline. In various examples, the ALU 320 does not include the data latch stage 328.

The adaptive CMS logic circuit 340 includes a first latch 342 coupled to latch the comparator output 318 in response to a first latch control signal set_cms 352. The first latch 342 can be reset via latch reset signal rst_cms 351. A second latch 344 is coupled to latch the output of the first latch 342 in response to a second latch control signal lat_dat_en 338, which is the same control signal used to control the data latch stage 328 in the illustrated embodiment. In other embodiments, the data latch stage 328 of the ALU 320 and the second latch 344 of the adaptive CMS logic circuit 340 may be controlled via separate control signals. The second latch 344 generates the adaptive CMS logic circuit output 364. In various examples, the output 364 is used as a control flag. In various examples, the adaptive CMS logic circuit 340 does not generate the output 364.

The adaptive CMS logic circuit 340 also includes a second multiplexer stage 346 coupled to receive a CMS feedback enable signal lat_wen_fb1 356-1 and a non-CMS feedback enable signal lat_wen_fb2 356-2. The second multiplexer stage 346 is configured to select either the CMS feedback enable signal 356-1 or the non-CMS feedback enable signal 356-2 to be coupled to the feedback latch enable signal 355 in response to the output of the first latch 342. In various examples, the CMS feedback enable signal 356-1 configures the ALU 320 to perform CMS calculations and the non-CMS feedback enable signal 356-2 configures the ALU 320 to perform non-CMS calculations. In so doing, the adaptive CMS logic circuit 340 can determine whether the ALU 320 performs CMS calculations or non-CMS calculations.

Figure 4:
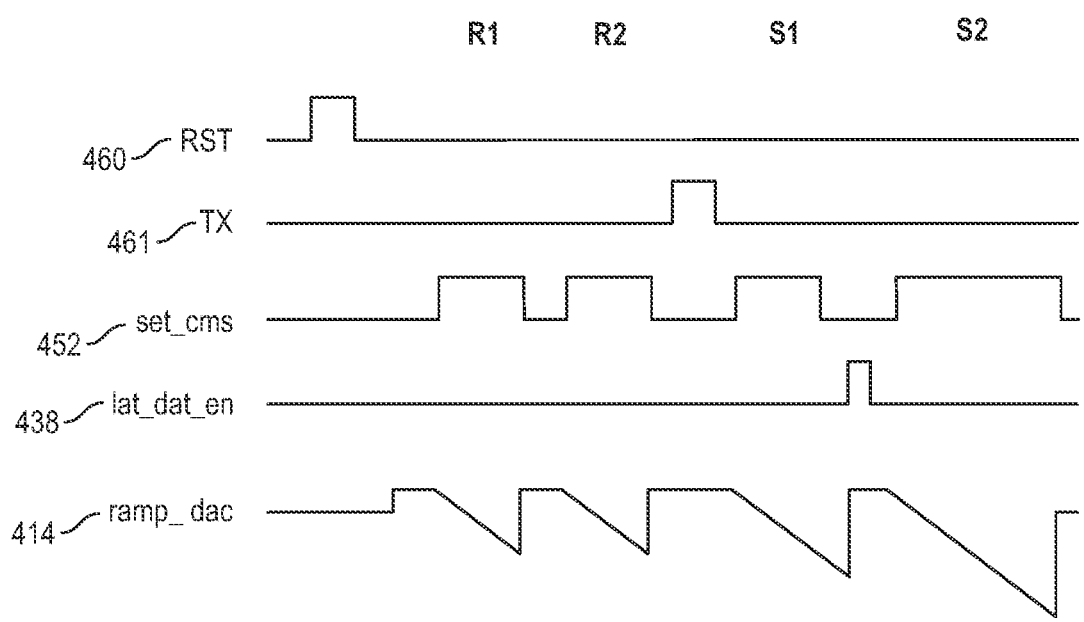
FIG. 4 illustrates an example readout timing diagram of a readout circuit in accordance with the teachings of the present disclosure.

FIG. 4 illustrates an example readout timing diagram of a readout circuit in accordance with the teachings of the present disclosure. It is appreciated the timing diagram of FIG. 4 may be an example timing diagram of the readout circuit 306 as shown in FIG. 3, and that similarly named and numbered elements described above are coupled and function similarly below.

The readout period includes reading out two reset signals R1, R2 and two image signals S1, S2 (i.e., m=2). In other embodiments, a greater number of pairs can be read out (e.g., m=4). Before the signals are readout, a reset signal RST 460 is pulsed to reset the pixel cell being read out. During the readouts of the reset signals R1, R2 and the image signals S1, S2, a first latch control signal set_cms 452, configured to control a first latch in an adaptive CMS logic circuit, remains on and a ramp signal ramp_dac 414 is ramped. Between the last reset signal readout R2 and the first image signal readout S1, a transfer transistor TX 461 coupled to a photodiode is pulsed to transfer the image charges to a floating diffusion and a corresponding signal to a comparator (e.g., the comparators 216 illustrated in FIG. 2). Between the first and second image signal readouts S1 and S2, a second latch control signal lat_dat_en 438 is pulsed.

The image signal ramp event 414 during the first image signal readout S1 is shorter than during the second, or last, image signal readout S2. This is because the first image signal S1 is used as a test case to determine whether the signal is small (e.g., dim) or large (e.g., bright). If the image signal is small, the bitline signal will intersect the shorter ramp signal during S1, causing the comparator to flip. A latch will latch the flipped comparator output to indicate to an ALU that the image signal is small and that CMS should be performed (e.g., use both image signal readouts S1 and S2). If the image signal is large, the bitline signal will fail to intersect the relatively short ramp signal 414 during the shorter image signal readout S1. The first latch will latch the non-flipped comparator output to indicate to the ALU that the image signal is large and that CMS should not be performed (i.e., discard the shorter image signal readout S1, which is inaccurate due to insufficient comparator range, and only use the longer image signal readout S2).

Figure 5A:
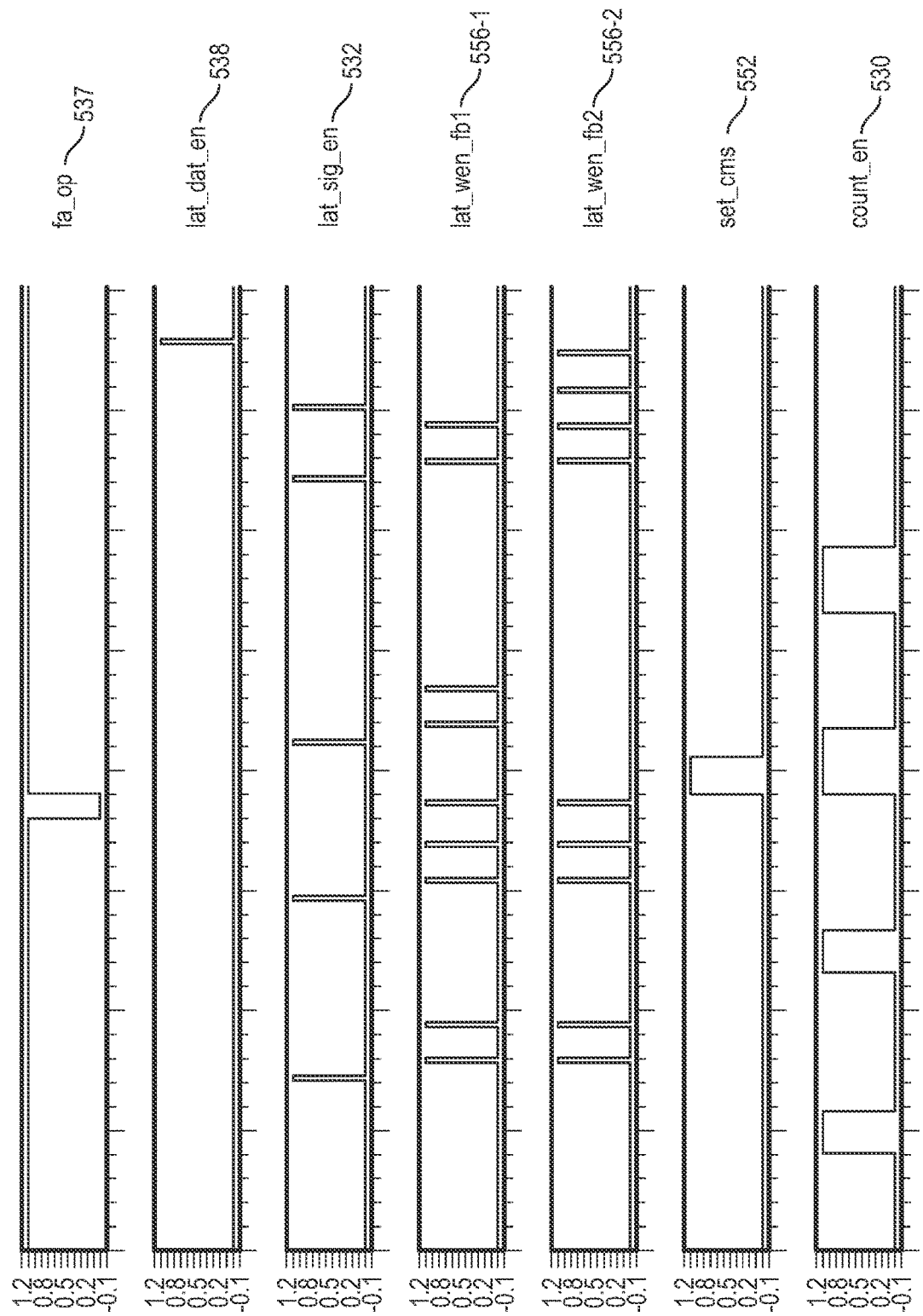
FIGS. 5A, 5B, and 5C illustrate example readout timing diagrams of a readout circuit in accordance with the teachings of the present disclosure.
Figure 5B:
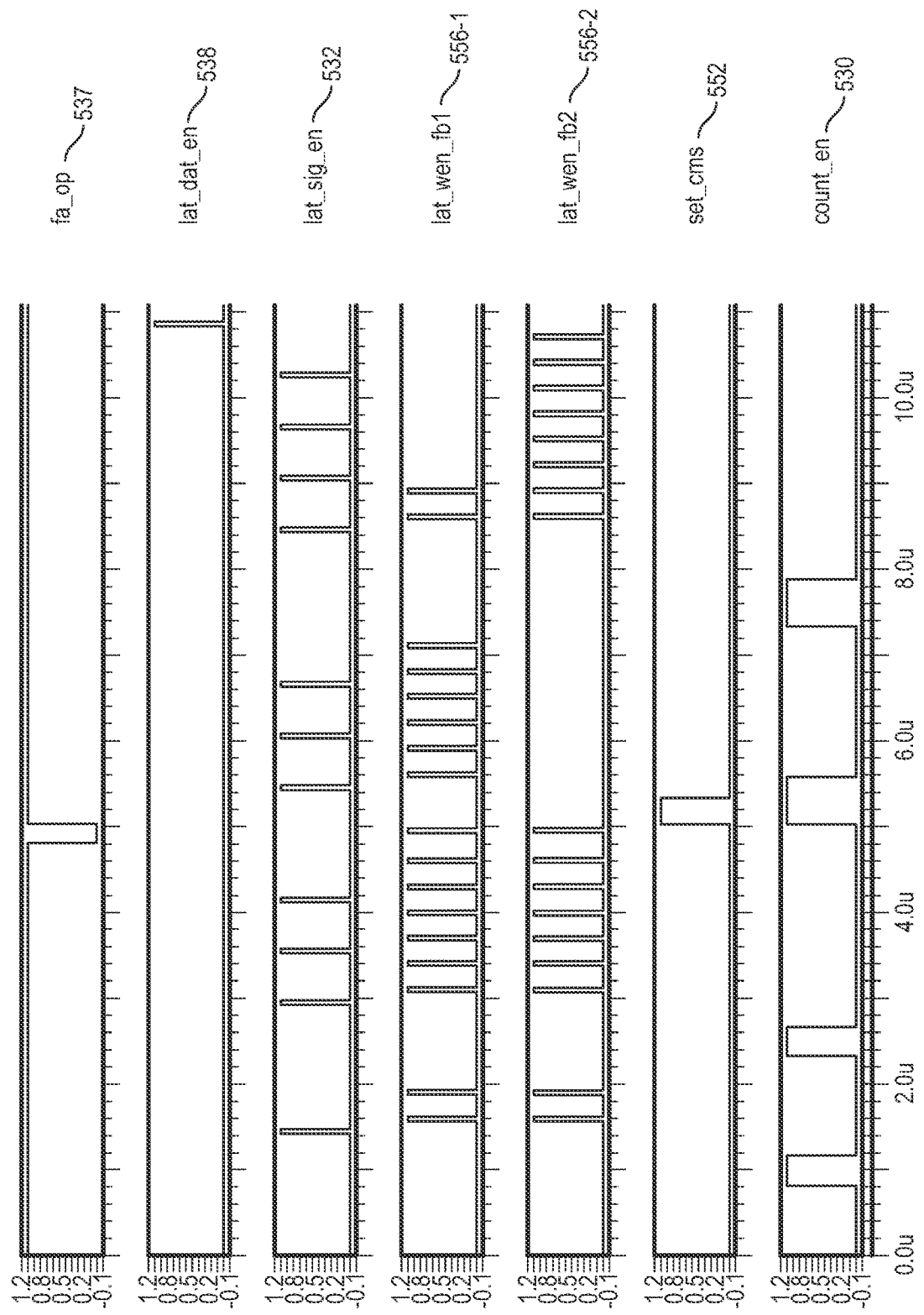
Figure 5C:
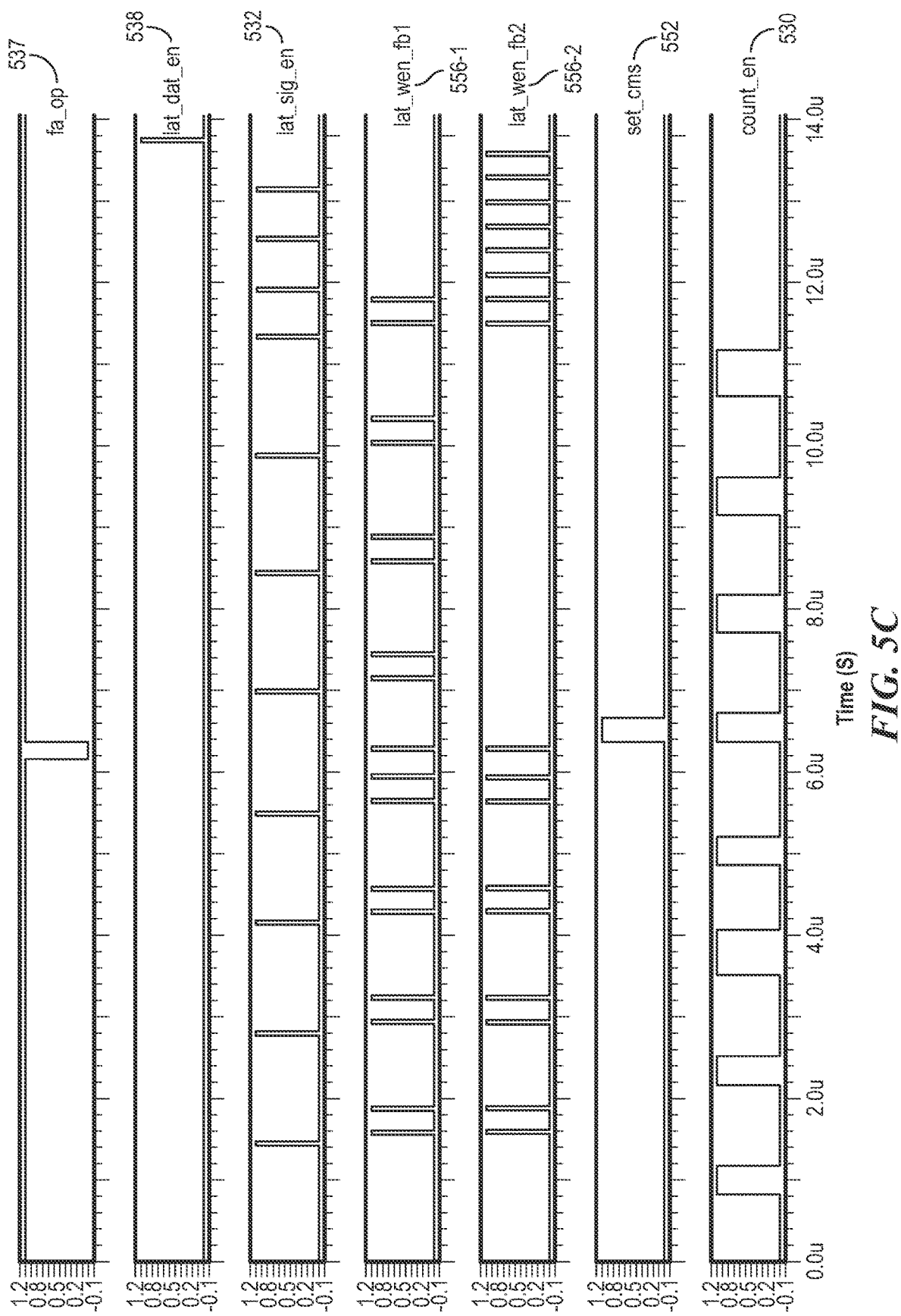

FIGS. 5A, 5B, and 5C illustrate example readout timing diagrams of a readout circuit in accordance with the teachings of the present disclosure. FIG. 5A illustrates a timing diagram of an adaptive CMS logic circuit and an ALU configured to perform non-weighted adaptive CMS using two reset-image signal pairs (i.e., m=2). FIG. 5B illustrates a timing diagram of an adaptive CMS logic circuit and an ALU configured to perform weighted adaptive CMS using two reset-image signal pairs (i.e., m=2). FIG. 5C illustrates a timing diagram of an adaptive CMS logic circuit and an ALU configured to perform non-weighted adaptive CMS using four reset-image signal pairs (i.e., m=4). It is appreciated the timing diagrams of FIGS. 5A-C may be example timing diagrams of the readout circuit 306 as shown in FIG. 3, and that similarly named and numbered elements described above are coupled and function similarly below.

Referring to FIGS. 5A-C together, counter enable signal count_en 530 is configured to pulse a number of times equal to the total number of reset signals and image signals (i.e., 2×m). A first latch control signal set_cms 552 is configured to pulse once during the first image signal, which is used as a test case to determine whether the image is large or small. For example, if the image signal is within the width of the pulse of the first latch control signal set_cms 552, the signal is determined to be small and CMS calculations are performed. Conversely, if the image signal width exceeds the width of the pulse of the first latch control signal set_cms 552, the signal is determined to be large and non-CMS calculations are performed. An adder operation signal fa_op 537 is configured to zero-pulse once during the readout period before the first image signal. Conversely, a data latch enable signal or second latch control signal lat_dat_en 538 is configured to pulse once during the readout period after the other control signals illustrated have pulsed.

A signal latch enable signal lat_sig_en 532 is configured to pulse according to the weights given to each reset or image signal. However, for the last image signal, the signal latch enable signal lat_sig_en 532 is pulsed a number of times equal to the total number of pulses done for the reset signals for when non-CMS calculations are performed. A CMS feedback enable signal lat_wen_fb1 556-1 is pulsed a number of times proportional to the weight given to each signal when performing CMS calculations, and once more between the reset and image signals. A non-CMS feedback enable signal lat_wen_fb2 556-2 is likewise pulsed a number of times proportional to the weight given to each signal when performing non-CMS calculations, and once more while the adder operation signal fa_op 537 is pulsed to support subtraction operations. The example timing diagrams are detailed below for each figure.

In FIG. 5A, which is for non-weighted adaptive CMS using two reset-image signal pairs (i.e., m=2), the signal latch enable signal lat_sig_en 532 is configured to pulse once for each of R1, R2, and S1, and then pulse twice for S2 since the signal 532 was pulsed a total of two times for the reset signals. Since each signal is given equal weight, the CMS feedback enable signal lat_wen_fb1 556-1 pulses twice for each signal, then once more between the reset and image signals. The non-CMS feedback enable signal lat_wen_fb2 556-2 pulses twice for R1, twice for R2, none for S1 since the test case has comparator range issues, four times for S2 since S2 must be counted twice to balance the two reset signals R1 and R2, and once more between the reset and image signals. The resulting CMS formula is −R1−R2+S1+S2, and the resulting non-CMS formula is −R1−R2+2*S2.

In FIG. 5B, which is for weighted adaptive CMS using two reset-image signal pairs (i.e., m=2), the signal latch enable signal lat_sig_en 532 is configured to pulse once for R1, three times for R2, three times for S1, and four times for S2 since the signal 532 was pulsed a total of four times for the reset signals. This allows each of R2 and S1 to be weighed three times as much as each of R1 and S2. The CMS feedback enable signal lat_wen_fb1 556-1 pulses twice for each "weight" given, then once more between the reset and image signals. The non-CMS feedback enable signal lat_wen_fb2 556-2 pulses twice for R1, six times for R2, none for S1 since the test case has comparator range issues, eight times for S2 since S2 must be counted four times to balance R1 and the three-times weighted R2, and once more while the adder operation signal fa_op 537 is pulsed to support subtraction operations. The resulting CMS formula is −R1−3*R2+3*S1+S2, and the resulting non-CMS formula is −R1−3*R2+4*S2.

In FIG. 5C, which is for non-weighted adaptive CMS using four reset-image signal pairs (i.e., m=4), the signal latch enable signal lat_sig_en 532 is configured to pulse once for each of R1, R2, R3, R4, S1, S2, and S3, and then pulse four times for S4 since the signal 532 was pulsed a total of four times for the reset signals. Since each signal is given equal weight, the CMS feedback enable signal lat_wen_fb1 556-1 pulses twice for each signal, then once more between the reset and image signals. The non-CMS feedback enable signal lat_wen_fb2 556-2 pulses twice for each of R1, R2, R3, and R4, non for S1, S2, and S3 since they are test cases with comparator range issues, eight times for S4 since S4 must be counted four times to balance the four reset signals R1, R2, R3, R4, and once more while the adder operation signal fa_op 537 is pulsed to support subtraction operations. The resulting CMS formula is −R1−R2−R3−R4+S1+S2+S3+S4, and the resulting non-CMS formula is-R1−R2−R3−R4+4*S4.

Figure 6:
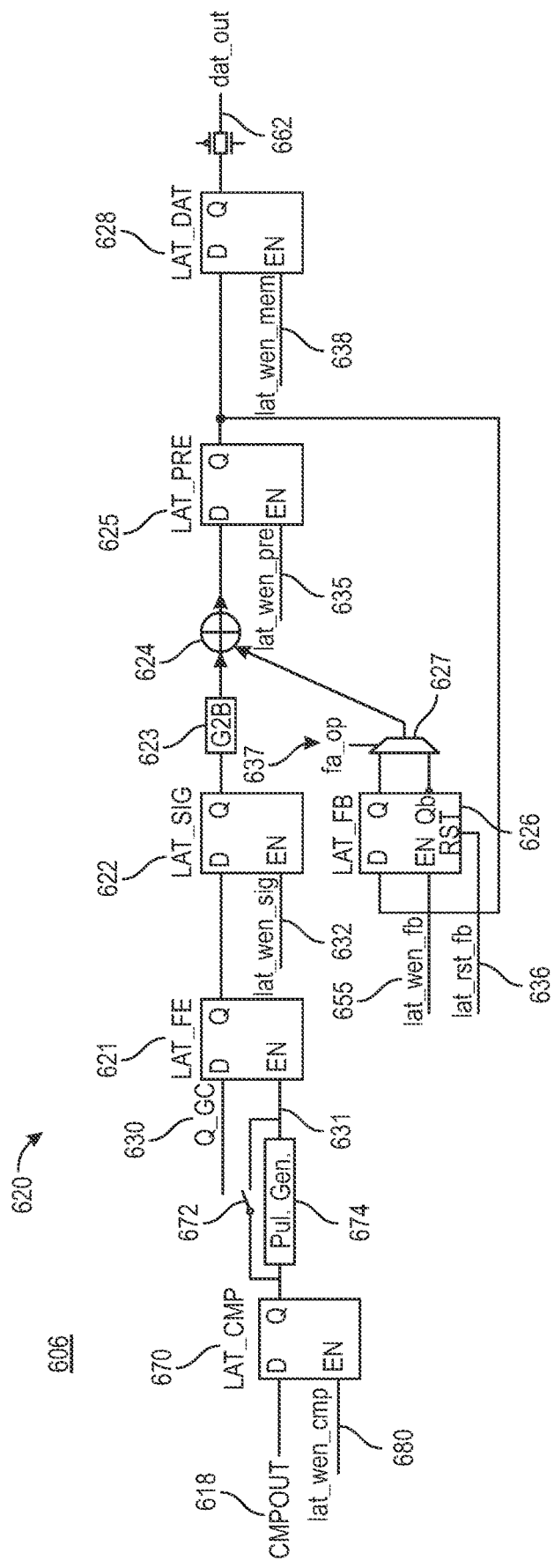
FIG. 6 illustrates another example readout circuit in accordance with the teachings of the present disclosure.

FIG. 6 illustrates another example readout circuit 606 in accordance with the teachings of the present disclosure. The readout circuit 606 includes an arithmetic logic unit (ALU) 620 coupled to receive a comparator output CMPOUT 618. It is appreciated the readout circuit 606 of FIG. 6 may be one example of the readout circuit 106 as shown in FIG. 1, the ALU 620 nay be one example of the ALUs 220 as shown in FIG. 2, and that similarly named and numbered elements described above are coupled and function similarly below.

The ALU 620 includes a comparator latch 670 configured to latch a comparator output CMPOUT 618 in response to a comparator latch control signal lat_wen_cmp 680. In various examples, the comparator latch 670 is an example of the first latch 342 (shown in FIG. 3). The ALU 620 also includes a front end latch stage 621 coupled to a GC generator (e.g., the GC generator 219 shown in FIG. 2) to latch GC outputs Q_GC 630 of the GC generator in response to the output of the comparator latch 670. The output of the comparator latch 670 may be directly coupled to the front end latch stage 621 via a bypass switch 672 or pass through a pulse trigger 674, either of which provides a front end latch enable signal 631. A signal latch stage 622 is coupled to latch outputs of the front end latch stage 621 in response to a signal latch enable signal lat_wen_sig 632. A GC to binary stage 623 is coupled to generate a binary representation of the GC outputs 630 latched in the signal latch stage 622.

An adder stage 624 includes first inputs and second inputs. In the illustrated example, the first inputs of the adder stage 624 are coupled to directly receive outputs of the GC to binary stage 623. In various examples, the first inputs of the adder stage 624 are coupled to receive the outputs of the GC to binary stage 623 through an error correction multiplexer stage. Outputs of the adder stage 624 are generated in response to the first inputs and the second inputs of the adder stage. A pre-latch stage 625 is coupled to latch outputs of the adder stage 624 in response to a pre-latch enable signal lat_wen_pre 635.

A feedback latch stage 626 is coupled to latch outputs of the pre-latch stage 625 in response to a feedback latch enable signal lat_wen_fb 655. The second inputs of the adder stage 624 are coupled to receive outputs of the feedback latch stage 626. As shown in the example, the outputs of the feedback latch stage 626 include a first output "Q" and a second output "Qb." The first output "Q" of the feedback latch stage 626 is the latched output of the pre-latch stage 625. The second output "Qb" of the feedback latch stage 626 is an inverted form of the latched output of the pre-latch stage 625.

In the illustrated example, the ALU 620 also includes a first multiplexer stage 627 coupled between the feedback latch stage 626 and the adder stage 624. In operation, the first multiplexer stage 627 is configured to select either the first output "Q" or the second output "Qb" of the feedback latch stage 626 to be coupled to the second input of the adder stage 624 in response to an adder operation signal fa_op 637. Therefore, it is appreciated that the feedback latch stage 626 is configured to feed back the output of the adder stage 624 back into the second input of the adder stage 624 through the pre-latch stage 625. In so doing, the sums generated by the adder stage 624 can be accumulated in the pre-latch stage 625 and then transferred to the feedback latch stage 26 over multiple summing operations of the adder stage 624 between resets of the feedback latch stage 626, via a feedback latch reset signal lat_rst_fb 636, in accordance with the teachings of the present disclosure.

As discussed above, it is appreciated that the adder stage 624 is configured to perform addition by adding a feedback value latched in the feedback latch stage 626 and the binary representation of the GC outputs latched in the signal latch stage 622 through GC to binary stage 623 when the first multiplexer stage 627 is configured to couple the first outputs "Q" of the feedback latch stage 626 to the second inputs of the adder stage 624. Similarly, the adder stage 624 is configured to perform subtraction by adding the two's complement representation of a feedback value latched in the feedback latch stage 626 and the binary representation of the GC outputs latched in the signal latch stage 622 through the GC to binary stage 623 when the first multiplexer stage 627 is configured to couple the second outputs "Qb" of the feedback latch stage 626 to the second inputs of the adder stage 624.

Continuing with the illustrated example, ALU 620 further includes a data latch stage 628 coupled between the pre-latch stage 625 and an ALU output 662. In operation, the data latch stage 628 is coupled to latch the output of the pre-latch stage 625 in response to a data latch enable signal lat_wen_mem 638. In various examples, the ALU output 662 is coupled to a global read bitline.

Figure 7A:
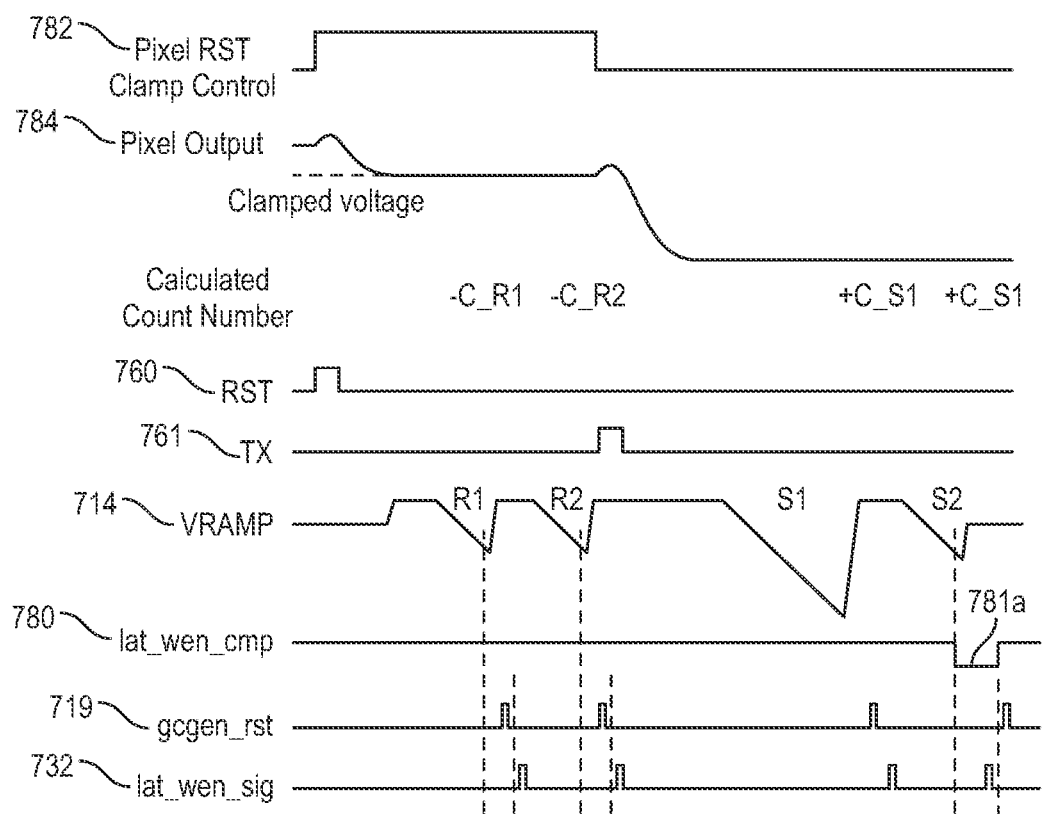
FIGS. 7A, 7B, and 7C illustrate example readout timing diagrams of a readout circuit in accordance with the teachings of the present disclosure.
Figure 7B:
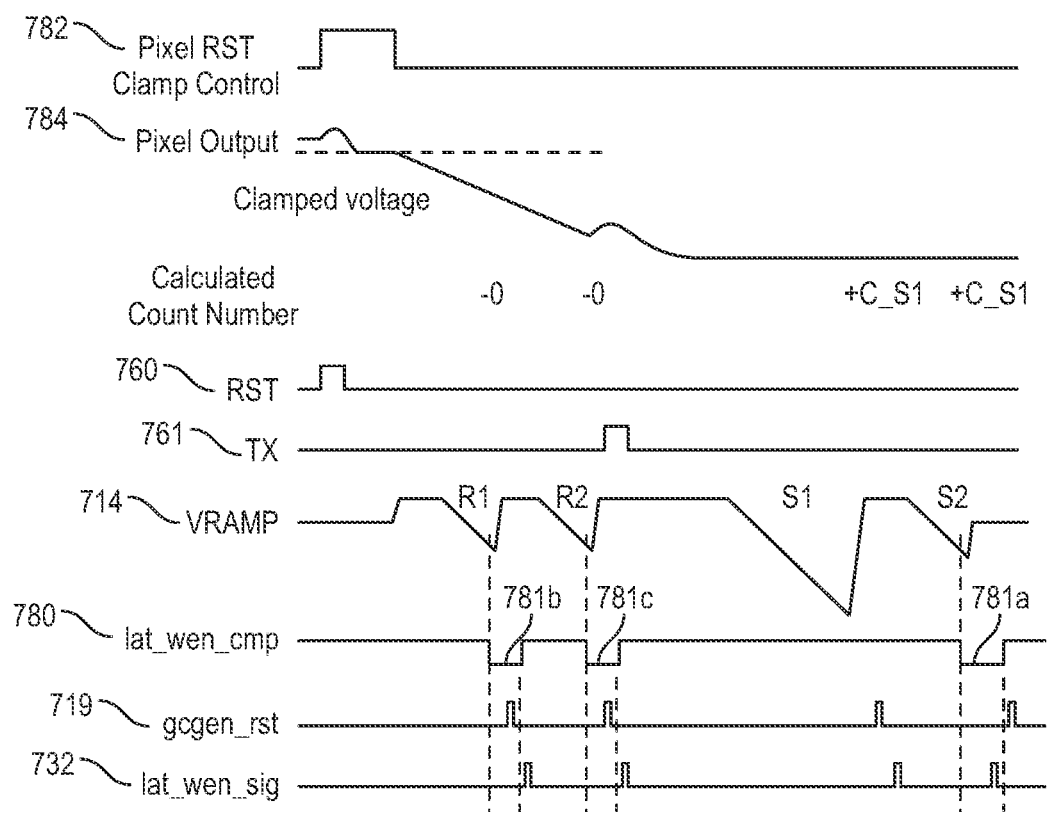
Figure 7C:
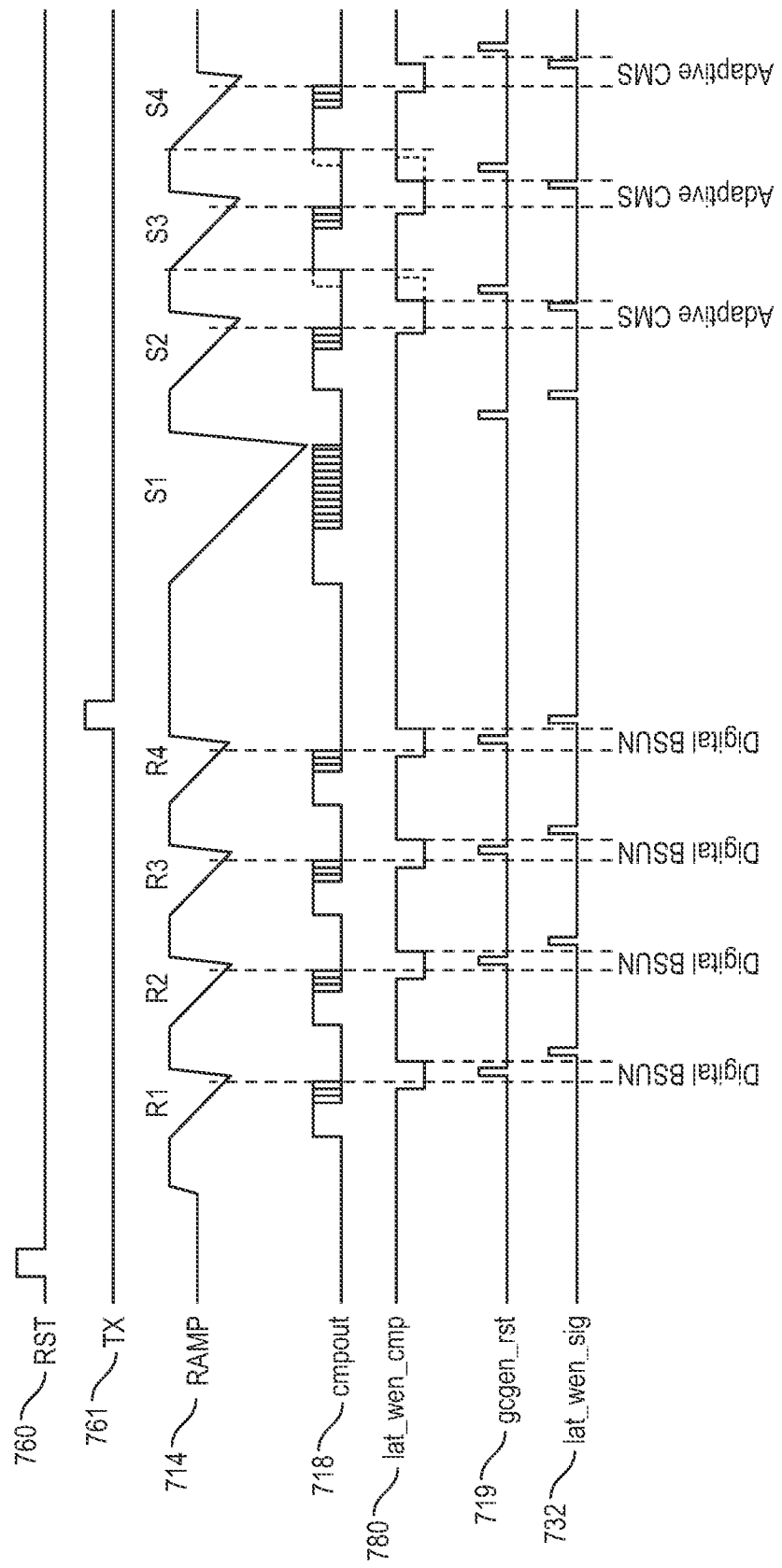

FIGS. 7A, 7B, and 7C illustrate example readout timing diagrams of a readout circuit in accordance with the teachings of the present disclosure. While both FIGS. 7A and 7B show examples of performing adaptive CMS, FIG. 7A illustrates an example of performing analog black sun compensation and FIG. 7B illustrates an example of performing digital black sun compensation. FIG. 7C shows an example of performing adaptive CMS with more than two samples. It is appreciated the timing diagrams of FIGS. 7A, 7B, and 7C may be example timing diagrams of the readout circuit 606 as shown in FIG. 6, and that similarly named and numbered elements described above are coupled and function similarly below.

Referring to both FIGS. 7A and 7B, the readout period includes reading out two reset signals R1, R2 and two image signals S1, S2. In the illustrated examples, the ramp VRAMP 714 during the first image signal S1 is longer than the ramp 714 during the second image signal S2. The second image signal S2 (and any subsequent image signals) is used as the test case to determine whether to perform CMS calculations or non-CMS calculations. One drawback of this ramp configuration is that the timing between each test case reset-image signal pair (e.g., between R2 and S2, between R3 and S3) is increased due to the longer ramp of the first image signal S1. As a result, the second image signal S2 (and subsequent image signals) can suffer from slightly worsened noise performance due to reduced corrections of their respective noise. However, the illustrated ramp configuration allows for simpler circuit implementation and control. For example, the adaptive CMS logic circuit 340 (shown in FIG. 3) need not include the second latch 344.

Before the signals are read out, a reset signal RST 760 is pulsed to reset the pixel cell being read out. During and/or after the ramps corresponding to the reset signals R1, R2 and the image signals S1, S2, a GC generator reset signal gcgen_rst 719 and a signal latch enable signal lat_wen_sig 732 are each pulsed. Between the last reset signal readout R2 and the first image signal readout S1, a transfer transistor TX 761 coupled to a photodiode is pulsed to transfer the image charges to a floating diffusion and a corresponding signal to a comparator (e.g., the comparators 216 illustrated in FIG. 2). During and/or after the ramp for the second image signal S2, the comparator latch control signal lat_wen_cmp 780 controlling a comparator latch (e.g., the comparator latch 670) is zero pulsed 781a in order to prevent a front end latch stage from sampling the second image signal S2 triggered by the comparator. Instead, the signal latch enable signal lat_wen_sig 732 is pulsed such that a signal latch stage latches the output of the front end latch stage, which stores the first image signal S1 from its previous operation. This enables the ALU to sample the first image signal twice for non-CMS calculations in a shorter amount of time.

Referring to FIG. 7A, the comparator latch control signal lat_wen_cmp 780 remains high during both reset signals readouts R1, R2, allowing the imaging system to perform analog black sun compensation. In bright light conditions, image charges overflow from the photodiode into the floating diffusion, and the pixel output voltage 784 becomes low after the reset signal RST 760 is pulsed. The pixel output voltage level 784 during the reset signal readouts R1, R2 may be similar to the voltage level 784 during the image signal readouts S1, S2, preventing the imaging system from properly distinguishing between them and leading to an ADC output of zero. To address this issue, a pixel RST clamp 782 is applied to the pixel output 784 during the reset signal readouts R1, R2. As a result, the imaging system can perform CMS for the reset signals, but not for the image signals, yielding a calculated count number of (C_S1+C_S1)−(C_R1+C_R2).

Referring to FIG. 7B, the comparator latch control signal lat_wen_cmp 780 is zero pulsed 781b, 781c during each of the reset signal readouts R1, R2, allowing the imaging system to perform digital black sun compensation. The pixel RST clamp 782 is applied to the pixel output 784 for a shorter period of time (e.g., stopping before the reset signal readouts R1, R2, after autozero). If the comparator does not flip before the falling edges of the comparator latch control signal lat_wen_cmp 780 during the reset signal readouts R1, R2, a pulse trigger (e.g., the pulse trigger 674) may not be pulsed. Then, a GC generator is reset by the GC generator reset signal gcgen_rst 719. Afterward, the front end latch stage (e.g., the front end latch stage 621) stores a zero value at the rising edge of the comparator latch control signal lat_wen_cmp 780. Finally, the count number is calculated as (C_S1+C_S1)−0, which is larger than the count number calculated per analog black sun compensation (C_S1+C_S1)−(C_R1+C_R2). Moreover, because the pixel RST clamp 782 is applied to the pixel output 784 for a shorter period of time, the pixel RST clamp 782 can be increased since CDS or CMS calculations can cancel the small voltage variation during the autozero period. Therefore, performing digital black sun compensation enables a wider signal range.

Compared to FIGS. 7A and 7B, which show examples of performing adaptive CMS with two samples, FIG. 7C shows an example of performing adaptive CMS with four samples. It is appreciated that three or more than three samples can be used to perform adaptive CMS in accordance with the teachings of the present disclosure. Referring to FIG. 7C, the comparator output cmpout 718 can be pulsed for each of the reset signal ramp events 714 and each of the image signal ramp events 714. In some embodiments, the rising edge of cmpout 718 (i.e., the beginning of the cmpout 718 pulse) can be configured to coincide with or occur earlier than the beginning of the third and fourth image signal ramp events S3 and S4 (and subsequent image signal ramp events), as indicated by the dotted lines. In some embodiments, the rising edge of the comparator latch control signal lat_wen_cmp 780 (i.e., the end of the lat_wen_cmp 780 zero-pulse) can be configured to occur while cmpout 718 is being pulsed. In some embodiments, the rising edge of the comparator latch control signal lat_wen_cmp 780 can be configured to occur earlier than the beginning of the third and fourth image signal ramp events S3 and S4 (and subsequent image signal ramp events).

In operation, if a bright pixel is detected, a comparator latch (e.g., the comparator latch 670) may be configured to not update a front end latch stage (e.g., the front end latch stage 621) with GC outputs (e.g., Q_GC 630) when there is no rising edge in a front end latch enable signal (e.g., the front end latch enable signal 631) output by the comparator latch. As a result, the front end latch stage may continue storing the value from the first image signal ramp event S1 even after subsequent image signal ramp events (i.e.,S2, S3, S4, etc.). Thus, the final value calculated for a bright pixel by performing adaptive CMS can be (S1*4−(R1+R2+R3+R4))/4. In the case of a low light pixel, the front end latch stage can be configured to store new values with each new image signal ramp event such that the final value calculated for a non-bright pixel by performing adaptive CMS can be (S1+S2+S3+S4)−(R1+R2+R3+R4))/4.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. An arithmetic logic circuit (ALU), comprising:
   a front end latch stage coupled to a Gray code (GC) generator to latch GC outputs of the GC generator in response to a comparator output;
   a signal latch stage coupled to latch outputs of the front end latch stage in response to a signal latch enable signal;
   a GC to binary stage coupled to generate a binary representation of the GC outputs latched in the signal latch stage;
   an adder stage including first inputs and second inputs, wherein the first inputs of the adder stage are coupled to receive outputs of the GC to binary stage, wherein outputs of the adder stage are generated in response to the first inputs and the second inputs of the adder stage;
   a pre-latch stage coupled to latch outputs of the adder stage in response to a pre-latch enable signal; and
   a feedback latch stage coupled to latch outputs of the pre-latch stage in response to a feedback latch enable signal, wherein the second inputs of the adder stage are coupled to receive outputs of the feedback latch stage, wherein the feedback latch enable signal is one of a correlated multiple sampling (CMS) feedback enable signal and a non-CMS feedback enable signal,
   wherein the ALU is configured to perform CMS calculations in response to the CMS feedback enable signal, and
   wherein the ALU is configured to perform non-CMS calculations in response to the non-CMS feedback enable signal.

2. The ALU of claim 1, wherein the outputs of the feedback latch stage include first outputs and second outputs, wherein the first outputs of the feedback latch stage are the latched outputs of the pre-latch stage, wherein the second outputs of the feedback latch stage are inverted latched outputs of the pre-latch stage, and wherein the ALU further comprises:
   a first multiplexer coupled between the feedback latch stage and the adder stage, wherein the first multiplexer is configured to couple either the first outputs or the second outputs of the feedback latch stage to the second inputs of the adder stage in response to an adder operation signal.

3. The ALU of claim 1, further comprising a second multiplexer coupled to the feedback latch stage, wherein the second multiplexer is coupled to receive the CMS feedback enable signal and a non-CMS feedback enable signal, wherein the second multiplexer is configured to select one of the CMS feedback enable signal and the non-CMS feedback enable signal in response to an image signal size signal to generate the feedback latch enable signal.

4. The ALU of claim 3, further comprising a select CMS latch coupled to latch the comparator output in response to a set CMS signal, wherein the select CMS latch is configured to generate the image signal size signal.

5. The ALU of claim 4, further comprising an image signal size latch coupled to latch the outputs of the select CMS latch in response to a data latch enable signal.

6. The ALU of claim 5, further comprising a data latch stage coupled to latch outputs of the pre-latch stage in response to the data latch enable signal.

7. The ALU of claim 1, further comprising an error correction multiplexer coupled between the GC to binary stage and the adder stage, wherein the error correction multiplexer is coupled to receive the outputs of the GC to binary stage and an error correction bitline signal, wherein the multiplexer stage is coupled to generate error correction multiplexer outputs in response to an error correction select signal, and wherein the first inputs of the adder stage are coupled to receive the multiplexer stage outputs.

8. The ALU of claim 1, wherein the comparator output is generated in response to a comparison between a bitline signal and a ramp signal, wherein the ramp signal includes a plurality of image signal ramp events, wherein a transition in the set CMS signal is configured to occur when one or more of the plurality of image signal ramp events occur in the ramp signal.

9. The ALU of claim 8, wherein a last one of the image signal ramp events is longer than remaining ones of the image signal ramp events.

10. The ALU of claim 8, wherein a first one of the image signal ramps is longer than remaining ones of the image signal ramp signal events.

11. The ALU of claim 1, further comprising a comparator latch coupled to latch the comparator output in response to a comparator latch enable signal, wherein the front end latch stage coupled to latch GC outputs of the GC generator in response to an output of the comparator latch.

12. The ALU of claim 11, wherein the comparator output is generated in response to a comparison between a bitline signal and a ramp signal, wherein the ramp signal includes a plurality of reset signal ramp events and a plurality of image signal ramp events, wherein a first one of the image signal ramp events is longer than remaining ones of the image signal ramp events, wherein the comparator latch enable signal is configured to be zero-pulsed during the remaining ones of the image signal ramp events, wherein the comparator latch enable signal is configured to remain high during the reset signal ramp events, and wherein a pixel reset clamp is configured to clamp a pixel output during the reset signal ramp events and enable the ALU to perform analog black sun compensation.

13. The ALU of claim 11, wherein the comparator output is generated in response to a comparison between a bitline signal and a ramp signal, wherein the ramp signal includes a plurality of reset signal ramp events and a plurality of image signal ramp events, wherein a first one of the image signal ramp events is longer than remaining ones of the image signal ramp events, wherein the comparator latch enable signal is configured to be zero-pulsed during the remaining ones of the image signal ramp events, wherein the comparator latch enable signal is configured to be zero-pulsed during each of the reset signal ramp events, and wherein a GC generator reset signal is configured to be pulsed while the comparator latch enable signal is zero-pulsed during each of the reset signal ramp events and enable the ALU to perform digital black sun compensation.

14. The ALU of claim 1, wherein the ALU is one of a plurality of ALUs coupled to a pixel array of an imaging system, wherein the plurality of ALUs are configured to determine a difference between an accumulated sum of one or more signal level samples and an accumulated sum of one or more black level samples from each of a plurality of pixel circuits of the pixel array.

15. An imaging system, comprising:
a plurality of comparators coupled to receive a global ramp signal;
a gray code (GC) generator; and
a plurality of arithmetic logic units (ALUs) coupled to receive comparator outputs from corresponding ones of the comparators and to receive GC outputs generated by the GC generator, wherein each one of the ALUs comprises:
a front end latch stage coupled to the GC generator to latch the GC outputs of the GC generator in response to a corresponding one of the comparator outputs;
a signal latch stage coupled to latch outputs of the front end latch stage in response to a signal latch enable signal;
a GC to binary stage coupled to generate a binary representation of the GC outputs latched in the signal latch stage;
an adder stage including first inputs and second inputs, wherein the first inputs of the adder stage are coupled to receive outputs of the GC to binary stage, wherein outputs of the adder stage are generated in response to the first inputs and the second inputs of the adder stage;
a pre-latch stage coupled to latch outputs of the adder stage in response to a pre-latch enable signal; and
a feedback latch stage coupled to latch outputs of the pre-latch stage in response to a feedback latch enable signal, wherein the second inputs of the adder stage are coupled to receive outputs of the feedback latch stage,
wherein the feedback latch enable signal is one of a correlated multiple sampling (CMS) feedback enable signal and a non-CMS feedback enable signal,
wherein the ALU is configured to perform CMS calculations in response to the CMS feedback enable signal, and
wherein the ALU is configured to perform non-CMS calculations in response to the non-CMS feedback enable signal.

16. The imaging system of claim 15, wherein the outputs of the feedback latch stage include first outputs and second outputs, wherein the first outputs of the feedback latch stage are the latched outputs of the pre-latch stage, wherein the second outputs of the feedback latch stage are inverted latched outputs of the pre-latch stage, and wherein each one of the ALUs further comprises:
a first multiplexer coupled between the feedback latch stage and the adder stage, wherein the first multiplexer is configured to couple either the first outputs or the second outputs of the feedback latch stage to the second inputs of the adder stage in response to an adder operation signal.

17. The imaging system of claim 15, wherein each one of the ALUs further comprises a second multiplexer coupled to the feedback latch stage, wherein the second multiplexer is coupled to receive the CMS feedback enable signal and a non-CMS feedback enable signal, wherein the second multiplexer is configured to select one of the CMS feedback enable signal and the non-CMS feedback enable signal in response to an image signal size signal to generate the feedback latch enable signal.

18. The imaging system of claim 17, wherein each one of the ALUs further comprises a select CMS latch coupled to latch the comparator output in response to a set CMS signal, wherein the select CMS latch is configured to generate the image signal size signal.

19. The imaging system of claim 18, wherein each one of the ALUs further comprises an image signal size latch coupled to latch the outputs of the select CMS latch in response to a data latch enable signal.

20. The imaging system of claim 19, wherein each one of the ALUs further comprises a data latch stage coupled to latch outputs of the pre-latch stage in response to the data latch enable signal.

21. The imaging system of claim 15, wherein each one of the ALUs further comprises an error correction multiplexer coupled between the GC to binary stage and the adder stage, wherein the error correction multiplexer is coupled to receive the outputs of the GC to binary stage and an error correction bitline signal, wherein the multiplexer stage is coupled to generate error correction multiplexer outputs in response to an error correction select signal, and wherein the first inputs of the adder stage are coupled to receive the multiplexer stage outputs.

\* \* \* \* \*